United States Patent
Laurinavichus

(10) Patent No.: US 7,933,398 B1
(45) Date of Patent: Apr. 26, 2011

(54) SYSTEM AND METHOD FOR CALL BRIDGING IN A CALL CENTER USING A VIRTUAL PRIVATE NETWORK

(75) Inventor: Vladislav I. Laurinavichus, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1397 days.

(21) Appl. No.: 10/981,600

(22) Filed: Nov. 5, 2004

(51) Int. Cl.
*H04M 3/00* (2006.01)

(52) U.S. Cl. ......... 379/265.02; 379/221.14; 379/221.15; 379/219; 379/380; 370/401; 370/402; 370/911

(58) Field of Classification Search ............. 379/220.15, 379/221.14, 221.15, 380, 219, 265.02
See application file for complete search history.

(56) References Cited

U.S. PATENT DOCUMENTS

| | | | | |
|---|---|---|---|---|
| 4,656,658 | A * | 4/1987 | King | 379/221.06 |
| 5,848,131 | A | 12/1998 | Shaffer et al. | |
| 5,862,203 | A * | 1/1999 | Wulkan et al. | 379/114.02 |
| 6,111,945 | A * | 8/2000 | Goel et al. | 379/220.01 |
| 6,366,668 | B1 * | 4/2002 | Borst et al. | 379/266.04 |
| 6,661,882 | B1 | 12/2003 | Muir et al. | |
| 6,801,613 | B1 * | 10/2004 | Hamilton | 379/207.02 |
| 6,970,548 | B2 * | 11/2005 | Pines et al. | 379/218.01 |
| 7,079,849 | B2 | 7/2006 | Hanson | |
| 7,145,898 | B1 * | 12/2006 | Elliott | 370/352 |
| 7,180,993 | B2 * | 2/2007 | Hamilton | 379/207.02 |
| 2004/0252822 | A1 | 12/2004 | Statham et al. | |
| 2005/0084088 | A1 * | 4/2005 | Hamilton | 379/207.02 |
| 2005/0195741 | A1 * | 9/2005 | Doshi et al. | 370/230 |

OTHER PUBLICATIONS

Office Action in U.S. Appl. No. 10/964,769 mailed Nov. 18, 2009.
Office Action in U.S. Appl. No. 10/964,769 mailed May 19, 2009.
Office Action in U.S. Appl. No. 10/964,769 mailed Dec. 5, 2008.
Office Action in U.S. Appl. No. 10/964,769 mailed Jun. 18, 2008.
Office Action in U.S. Appl. No. 10/964,769 mailed Apr. 22, 2010.
Notice of Allowance mailed Oct. 15, 2010 in U.S. Appl. No. 10/964,769.

* cited by examiner

*Primary Examiner* — Melur Ramakrishnaiah
*Assistant Examiner* — Yosef K Laekemariam

(57) ABSTRACT

A method and system for bridging a call in a network as well as a bridged call are provided. A call is received via a network. The call is connected to a first destination. The call is then directed from the first destination to a second destination. Intermediate connection links connecting the network, the first destination, and the second destination are associated with a dialed number identification service (DNIS) label associated with the call. The call is selectively bridged from the network to the second destination via a virtual network by: analyzing the DNIS label associated with each intermediate communication link; determining that the analyzed DNIS labels identify the intermediate links as part of the same call flow; establishing a direct connection between the network and the second destination via the virtual network; and terminating at least one of the intermediate communication links.

24 Claims, 4 Drawing Sheets

SYSTEM AND METHOD FOR CALL BRIDGING IN A CALL CENTER USING A VIRTUAL PRIVATE NETWORK

CROSS-REFERENCE TO RELATED APPLICATION

The subject matter of this application is related to the subject matter of copending U.S. patent application Ser. No. 10/964,769 filed Oct. 15, 2004 entitled "System and Method for Dynamic Assignment of Dialed Number Identification Services in Call Distribution System", which application names the same inventor as this application, is assigned or under obligation of assignment to the same entity as this application, and which application is incorporated herein by reference.

STATEMENT REGARDING FEDERALLY SPONSORED RESEARCH OR DEVELOPMENT

Not applicable.

FIELD OF THE INVENTION

The invention relates to the field of communications, and more particularly to an environment for automatically transferring (800) number call center and other calls to automatic call distributors or other remote destinations via a virtual private network, releasing intermediate connections for reuse once that connection is established.

BACKGROUND OF THE INVENTION

Modern large-scale call center and other support operations may involve the remote deployment of a number of interconnected resources including interactive voice response (IVR) farms, automatic call distributors (ACDs), customer service representative (CSRs) workstations along with other hardware, software, personnel and other assets. In a number of conventional call center architectures, various destination premises may located in geographically separated sites or locations, so that one set of IVR farms may be located in one city while a set of ACDs distributing calls to CSRs may be located in another city, or in another region or country. The efficient operation of those network resources, including call transfers and the capture and transport of call data, therefore becomes significant to the call center or other operator.

In a typical scenario, a toll-free (800) or other call may be received over a long distance network, such as the public switched telephone network (PSTN) or a cellular network, at or in a call center. Often the call may be first directed to an automated call response resource such as an interactive voice response (IVR) unit or farm. The IVR unit may for example present the caller with a voice menu which invites the user to enter account numbers or other caller entered digits (CED), voice recognition responses or other inputs. Upon completion of the voice menu script, for some percentage of callers the actions or responses required by the caller's inquiry may require the call to be transferred to another destination, such as an automatic call distributor (ACD) located at other premises.

The ACD or other premises logic may then transfer the call to one of a group of customer service representatives (CSRs), for instance at workstations equipped with database or other tools to service the caller's inquiry. Call data such as account numbers, user names or IDs or other data may also be linked with the call and transported to the ultimate CSR workstation or other destination, using various techniques. The CSR can then respond to the caller's inquiry with pertinent account or other data at hand.

However, in conventional architectures the network connections which bridge the original call dialed in through the long distance network to the IVR, ACD and other resources are generally kept open and connected to maintain, service and complete the call during the entire duration of the call. Intermediate connections may be maintained even after, for instance, the IVR unit is finished interacting with the caller. The call is simply routed from the long distance network, to an IVR or other first resource, then further connected or bridged to the ACD or next premise equipment in daisy-chain fashion. As a consequence, switches and ports which switch the call may be kept occupied by the bridged call from end to end, tying up network capacity while the call remains in process. In addition, some leased lines or other voice or data connections may be kept open while the sequence of connections is maintained, causing per-minute, per-connection or other charges to accumulate over the entire set of bridged connections while the call remains active.

Other problems and inefficiencies in toll-free and other call distribution schemes exist.

SUMMARY OF THE INVENTION

The invention overcoming these and other problems in the art relates in one regard to a system and method for call bridging in a call center using a virtual private network, in which a toll-free (800) or other call may be received, managed and distributed under control of a routing engine or other control logic which controls the distribution of the call to an IVR, ACD or other destination in sequence. According to embodiments, the routing engine may sense intermediate connections between switches, IVRs, ACDs and other hardware. The routing engine or other control logic may then bridge the call from the long distance network to the next or ultimate ACD or other destination, directly and therefore bypass those intermediate communications links. According to embodiments in one regard, the call may be bridged to the ACD or other destination, for instance to be placed into a CSR queue, via a virtual private network (VPN) or other network or connection. According to embodiments in another regard, the routing engine or other control logic may cause the intermediate links between IVRs, ACDs and other points to be terminated for instance by issuing or processing a release link trunk (RLT) or other command, instructions or data. The platform of the invention may in a further regard identify call data, such as caller-entered digits, voice recognition responses or other inputs corresponding to the call, by way of a dialed number information service (DNIS) label or other identifier. The DNIS label or other identifier may permit that captured data to be transmitted to a CSR workstation or other destination point, through or in parallel with the VPN bridge for the associated call. Because a call may be connected to its eventual destination through a VPN or other bridge, switches, ports, leased lines and other intermediate connections may be released as soon as possible, reducing network load and leased-line or other connection costs.

DETAILED DESCRIPTION OF EMBODIMENTS

Figure 1:
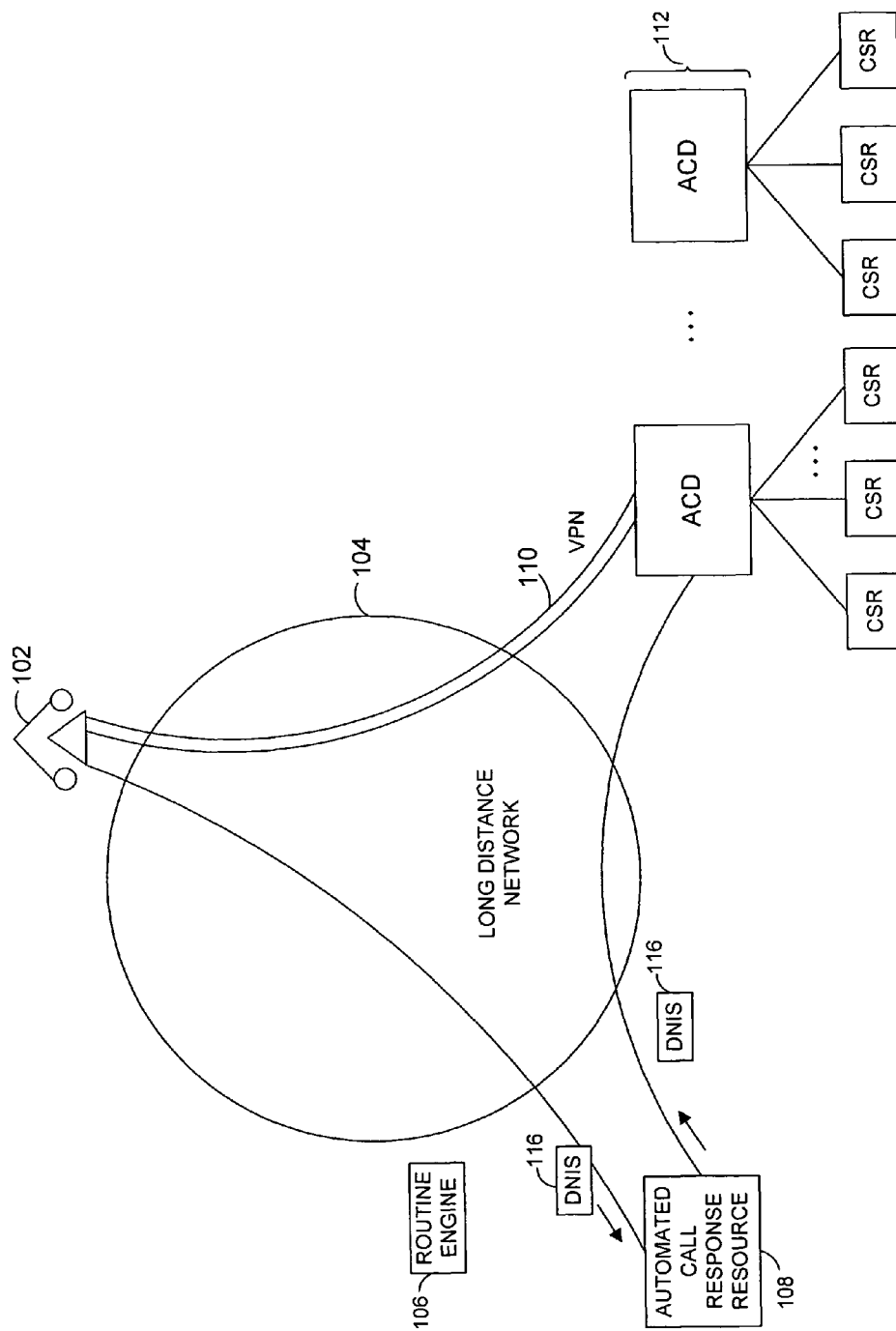
FIG. 1 illustrates an environment in which a system and method for call bridging in a call center using a virtual private network may operate, according to embodiments of the invention.

FIG. 1 illustrates an environment in which a system and method for call bridging in a call center using a virtual private network may operate, according to embodiments of the invention. As illustrated in that figure a caller 102 may initiate a call via a long distance network 104, or other network or connection. The caller 102 may initiate that call in a variety of ways, for instance by initiating a cellular call or other wireless call to a customer support number, or by dialing an (800) number, (900) number or other toll-free or other number via a landline connection through the public switched telephone network (PSTN) or other link. The call may likewise be initiated via a voice over Internet Protocol (VoIP) call or connection, or establishing a voice call or hybrid voice/data call via other wired or wireless channels, links or connections. The call may in embodiments be or include a direct-dialed, transferred, multi-party conference or other call or connection.

Once the call is initiated, according to embodiments of the invention in one regard the incoming call may be communicated to or directed by a routing engine 106, which may for instance be or include a server, database or other resource. The routing engine 106 and other resources may for instance be incorporated in an Advanced Intelligent Network (AIN) configuration or network, a Signaling System 7 (SS7) network or other communications network or fabric, and may in embodiments include or interface to intelligent call management (ICM) hardware, software, Genesys™ Network Routing solutions or other call routing solutions.

According to embodiments of the invention, the routing engine 106 may host control logic and other programmed, hardwired or other control to be applied to the incoming call, to analyze, route and manage the routing of the call to its initial, intermediate and/or eventual destination. That set of destinations as illustrated may be or include a number of local or remote physical or logical destinations including an automated call response resource 108, such as a set of interactive voice response (IVR) units, or sets or farms of IVR or similar equipment. The set of destinations may likewise include a set of automatic call distributors 112, or other destination or site, to which the call may for example be transferred after initial call processing at a first destination or site. The routing engine 106 in cooperation with other resources may analyze the call to generate an appropriate destination or transfer point for the type and purpose of the call. In embodiments, the first, second or other destinations may be or include local hardware, or hardware or other resources located on local or remote premises. Connections to remote premises may in cases be by leased long-distance or other communications or data links.

Call management according to conventional technologies might involve the transfer, for example, of the call to the automated call response resource 108, for instance to capture caller-entered data such as account, telephone or subscription numbers, and then transfer that call to a first ACD or other destination. In the event that ACD destination did not satisfy the caller's inquiry or request, the call might be routed back from that ACD to the automated call response resource 108, and then transferred to a second ACD. In conventional architectures all intermediate connections, switches, ports and lines would to stay open and connected to preserve the continuity of the call, until completion.

According to embodiments of the invention, however, the call may be processed to be bridged to the second, ultimate or other destination through an automatically generated, direct bridge to the operative ACD or other premises or destination site. As illustrated generally in FIG. 1, this may be accomplished through the connection of the call to the second or other destination ACD via a virtual private network 110. Virtual private network 110 may be, include, or interface to a transfer control protocol/Internet protocol (TCP/IP) connection in or through the long distance network 104, connecting the call to the second or other destination ACD. In embodiments, virtual private network 110 may include or incorporate security features such as data encryption, password protection, secure socket layer (SSL) connections, digital certificates or other authentication or other security techniques, protocols or processes.

In general, according to embodiments of the invention and as illustrated in FIG. 1, a DNIS label 116 may be associated with the call when first registered by routing engine 106, during transfer to a first ACD or other destination or at other comparatively early points in call processing. During some percentage of calls, a call transferred to a first destination ACD may require transfer to a second destination ACD. When the call is returned from the first destination ACD to the automated call response resource 108 under direction of routing engine 106 or other control, however, the network may sense that the further transferred call to a second ACD or other destination represents the same call flow as the first connection. That identification may be made for example by identifying or associating each intermediate connection with DNIS label 116 or other identifier. Routing engine 106 or other control may then establish a direct connection between the caller and the ultimate destination, over virtual private network 110.

Figure 2:
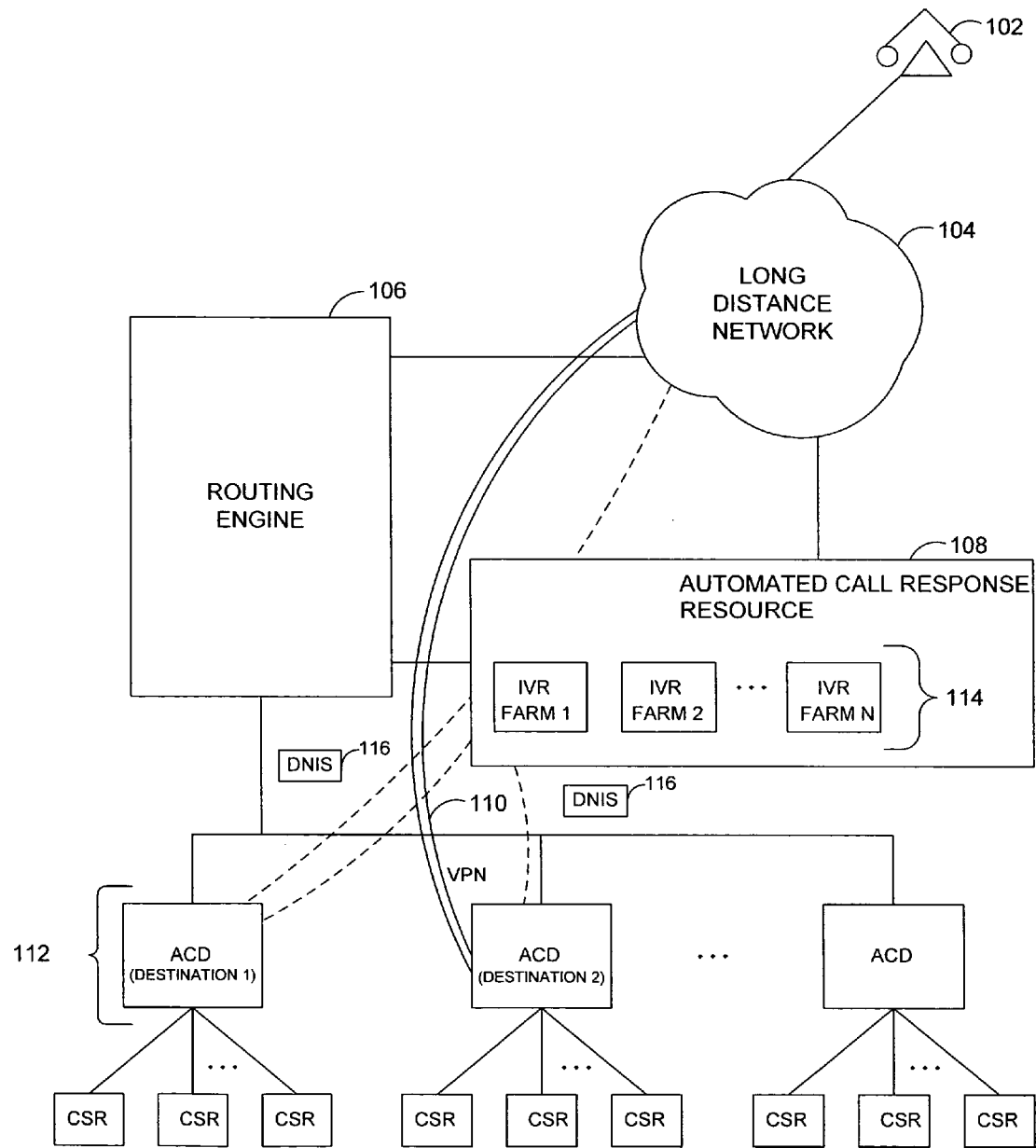
FIG. 2 illustrates an environment in which a system and method for call bridging in a call center using a virtual private network may operate, according to embodiments of the invention in another regard.

More particularly and as for example illustrated in FIG. 2, a caller 102 may thus initiate a call event through long distance network 104, for example by dialing an (800) or other toll-free or other telephone or other number. Under direction of routing engine 106 or other control, the call may be initially transferred to automated call response resource 108, for example to deliver the call to one of a set of interactive voice response farms 114. That set of resources may include one or more interactive voice response farms each containing one or more interactive voice response units, for instance units presenting voice menus to prompt for keypad touch-tone, to capture voice responses for voice recognition processing, to receive telephone typewriter (TTY) data, or to capture or process other input or data from, via or related to caller 102 and their inquiry. Call data, such as date and time of call, duration of call and the dialed number to which the call originated, for instance detected using the dialed number information services (DNIS), may also be captured before or during processing by automated response resource 108.

After capture of caller-entered data or call data within or by the point of reaching the automated call response resource 108, some percentage of calls may require further processing or interaction to satisfy the user's inquiry. The call may therefore need to be transferred to a first destination ACD within the set of automatic call distributors 112. According to embodiments of the invention in one regard, a DNIS label 116 may be associated with the call during that transfer, to use for example for purposes including identifying the originally dialed number and therefore, types or categories of service or response required by the call. DNIS label 116 may encode that information in a multi-field label, tag or other data structure which may include, for example, a 4-digit or other appended code indicating a desired ACD or other destination associated with the dialed number. Other encoding or identification schemes are possible.

Upon arrival in a first destination ACD within the set of automatic call distributors, the caller may for example be directed to a set of customer service representatives (CSRs) to have their inquiry further processed or researched, for instance by CSR dialogue and database access, as appropriate. Some percentage of calls may be satisfied and completed through that interaction, and terminate. However some remaining percentage of calls may remain unsatisfied or incomplete after CSR interaction at the first ACD destination, for instance after discovery that the caller's account inquiry dates back to a prior year, that the caller may wish to execute a brokerage trade, or for other reasons. In such cases the call may need to be transferred to a further destination or resource to attempt to satisfy the caller's inquiry.

In that event, the call may be transferred back to the automated call response resource 108, for purposes for instance of transmitting the call to a second destination ACD within the set of automatic call distributors 112. During initial setup for that transfer, the DNIS label 116 may likewise be communicated to automated call response resource 108, identifying the originally dialed number and other information. However, according to embodiments of the invention in one regard, rather than simply complete the next connection to the second ACD or other destination, the call may be processed to generate an automatic bridge to the second ACD or other destination, directly from or through the long distance network 104 or other point.

Thus, according to embodiments in one regard the routing engine 106 or other control logic may detect that any one or more of the call or connection connecting the caller from the long distance network 104 to the automated call response resource 108, the call or connection connecting the call from the automated call response resource 108 to the first ACD or other destination, the call or connection back from the first ACD or other destination to the automated call response resource 108, and the call or connection from the automated call response resource 108 to the second ACD or other destination each represent the same call or call flow. This may be detected, for example, in part by detected the 4-digit or other tags or information encoded in DNIS label 116.

Upon detection that the call to the first ACD destination, to the second ACD destination or other call or connection represents the same call or call flow, routing engine 106 and other control logic may initiate alternative connection setup to direct the call to that second ACD or other destination, for instance by requesting the first ACD to initiate a release link trunk (RLT) transfer. At the same time, call data, such as caller entered data or call time, date, dialed number or other objective data describing the call may in embodiments also be prepared for transfer to the second ACD or other destination. That information, which may for example be temporarily or permanently captured or stored in an SS7 or other network database or other data store, may also be identified by or with DNIS label 116 or other data or label for duplication or transfer to the second ACD or other destination or site. In embodiments, it may be noted that DNIS label 116 may be or include a dynamically assigned DNIS label or identifier such as the type described in the aforementioned copending U.S. patent application Ser. No. _____ "System and Method for Dynamic Assignment of Dialed Number Identification Services", or others.

More particularly, upon detection that the intermediate connections represent the same call or call flow, routing engine 106 or other control logic may initiate or activate a connection in or through virtual private network 110. Virtual private network 110 may connect the caller to or through the long distance network 104 or otherwise, to the second ACD destination within the set of automatic call distributors 112. When that connection via virtual private network 110 is established, according to embodiments of the invention a "release link trunk" command may also be enabled. That is, a command which permits the termination of a line trunk connecting the automated call response resource 108, the first and second destination ACDs, or other intermediate points may be enabled, to permit intervening switches, ports, lines and other network resources to be released upon receipt of a release signal, may be activated. Other commands or configuration options are possible.

Upon the setup and establishment of the bridge connection between caller 102 and the second ACD or other destination via virtual private network 110, the release link trunk command may be issued to intermediate switches, connections and other points. Thus, as the caller 102 accesses the second ACD or other destination and, for example, begins to interact with a representative within a CSR pool, the network intelligence may release and disengage all intermediate connections and ports, freeing those resources immediately for other use. In addition according to embodiments associated call data may also be accessed and presented at the point of the second ACD or other destination. Efficiency of network operation may therefore be enhanced, and leased line and other interconnect costs may be reduced.

Figure 3:
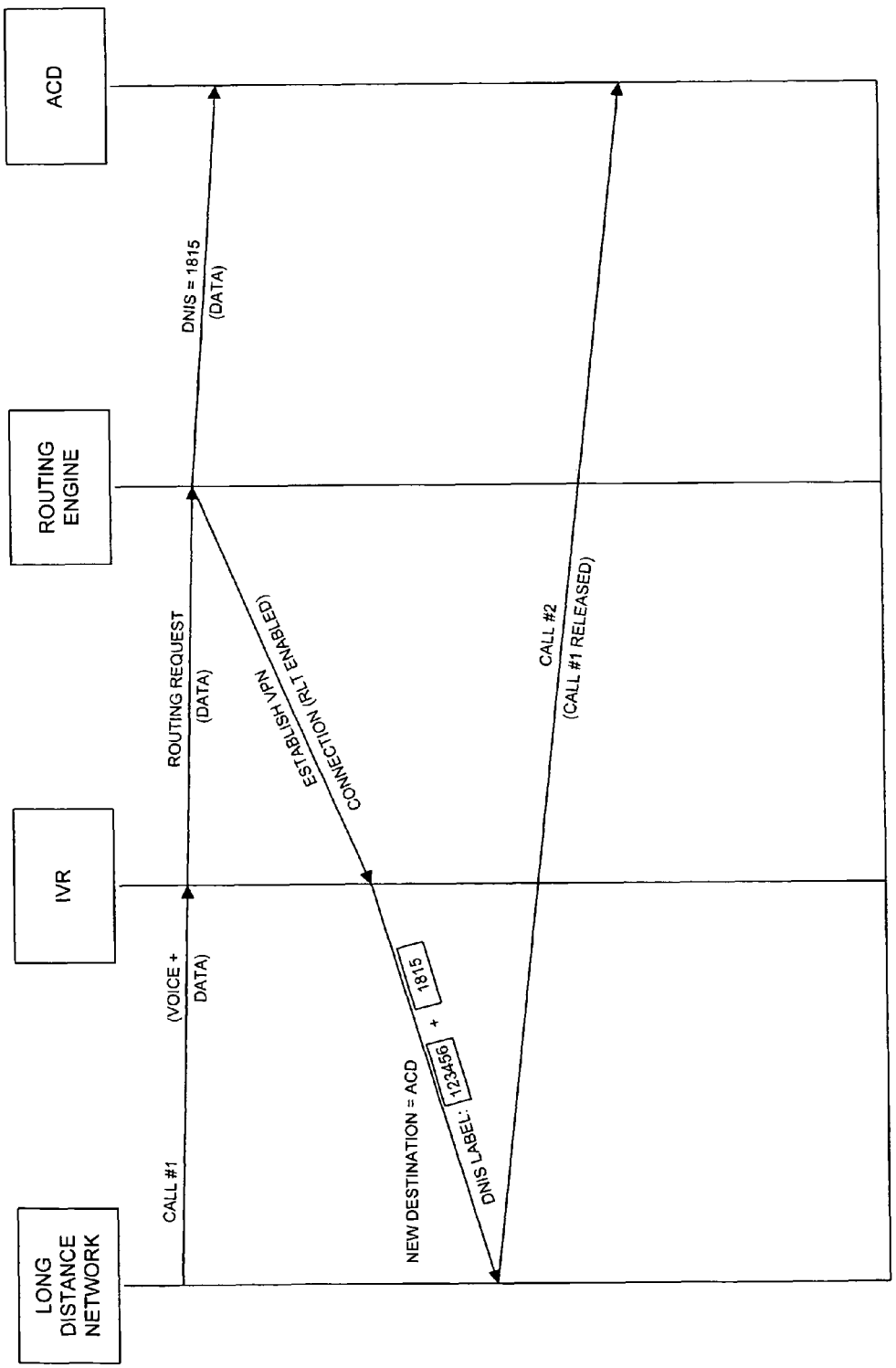
FIG. 3 illustrates a flow diagram of call connection processing using call labels and other data in a virtual private network, according to embodiments of the invention.

FIG. 3 illustrates a flow or state diagram of call bridging processing, according to embodiments of the invention. As shown, the originating call may be received via long distance network 104 in an interactive voice response (IVR) or other unit, for instance under control of routing engine 106. A routing request may be generated to the routing engine 106 after the call has been processed in the IVR or other automated call response resource 108, for instance to transfer the call to a first ACD or other destination within a set of automatic call distributors 112 or otherwise. The transferred call may be identified by or associated with DNIS label 116, or other label, tag or identifier. After that connection is established, routing engine 106 may establish a connection though virtual private network 110, for example when the call is not completed or satisfied in the first ACD or other destination. The virtual private network connection 110 may be established with a release link trunk or other switching command enabled.

The call may then be connected back to the IVR or other automated call response resource 108, along with the transmission of associated DNIS label 116 or other identifier. The automated call response resource 108 may communicate with the long distance network 104, including to transmit DNIS label 116 to that network for call identification and setup of the bridging connection via virtual private network 110. The call may then be bridged or connected via virtual private network 110 to the second ACD or other destination within the set of automatic call distributors 112, or other destination. Upon establishing that connection, intermediate connections including to the first ACD or other destination may be released or terminated, freeing those resources for other use.

Figure 4:
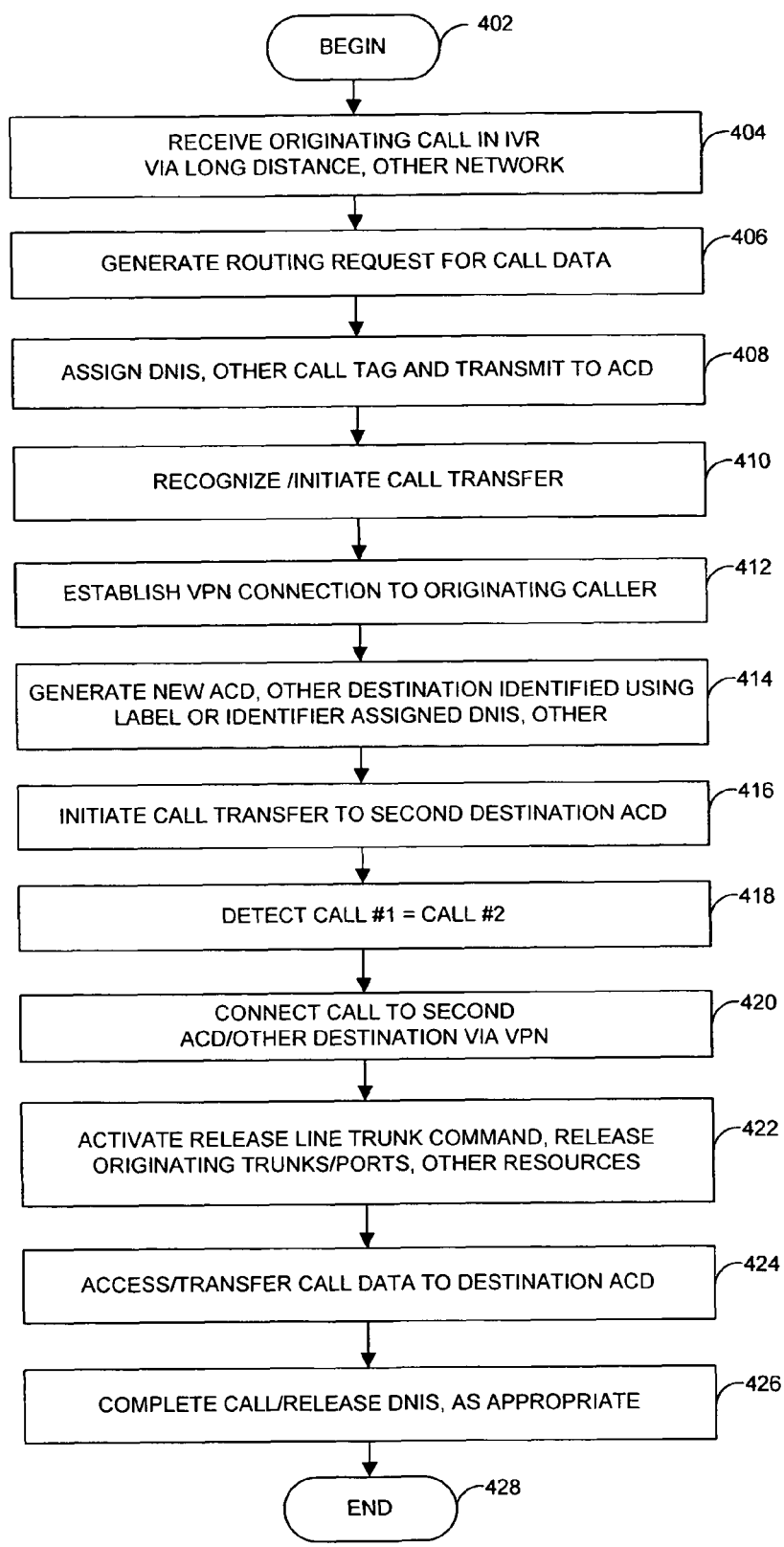
FIG. 4 illustrates overall call bridge processing, according to embodiments of the invention.

Overall call bridging and connection processing according to embodiments of the invention is illustrated in FIG. 4. In step 402, processing may begin. In step 404, an inbound, transferred, conference or other (800) number, (900) number or other call or transaction may be received from caller 102 or otherwise, for instance via long distance network 104 or other network or connection, in automated call response resource 108, such as an IVR or other unit. In step 406, a routing request may be generated to route the call, and for instance be transmitted to routing engine 106 or other logic control. In step 408, a DNIS label 116 or other label, tag or identifier may be generated or assigned to the call, and transmitted to a first destination ACD within a set of automatic call distributors 112. In step 410, a call transfer requirement may recognized and a call transfer may be initiated from that initial ACD or other first destination, for example to a second ACD or other destination based on caller-entered inputs requiring further inquiry or response.

In step 412, a connection via virtual private network 110 may be established to the originating call, for instance interfacing or connecting to or with long distance network 104, in embodiments with a release link trunk command or other control command, instruction, option or data enabled. In step 414, a new or second ACD other destination may be identified and for instance labeled by or associated with DNIS label 116 or other label, tag or identifier. In step 416, a call transfer to the second ACD or other destination may be initiated. In step 418, virtual private network 110, routing engine 106 or other network intelligence may detect that the first call to the first ACD or other destination and the second call to the second ACD or other destination, represent or constitute the same call, call flow or event. In step 420, the call to the second ACD or other destination may be connected via virtual private network 110.

In step 422, the release link trunk or other command may be activated, releasing the connection to the originating trunk, ports, switches or other resources supporting the connection to the first ACD or other destination. In step 424, call data associated with the call may be accessed or transferred to the second ACD or other destination, for instance for display on a CSR workstation or otherwise. In step 426, the call may be completed and DNIS label 116 or other label or identifier may be released, for instance to a DNIS assignment pool in embodiments when dynamic DNIS assignment is used. In step 428, processing may repeat, return to a prior processing point, jump to a further processing point or end.

The foregoing description of the invention is illustrative, and modifications in configuration and implementation will occur to persons skilled in the art. For instance, while the invention has generally been described in terms of an environment in which a routing engine directs a call from an initial IVR or other automated response host to a remote automatic call distributor (ACD), in embodiments the connection sequence may be from one IVR to another IVR, between two ACDs, may be extended between three IVRs, ACDs or other resources, or may follow other connections or paths.

Similarly, while the invention has generally been described as operating under control of one routing engine 106, in embodiments those control functions may be distributed amongst multiple controllers, processors or logic. Other hardware, software or other resources described as singular may in embodiments be distributed, and similarly resources described in embodiments as distributed may be combined. Further, while the invention has generally been described as employing a virtual private network (VPN) to bridge the call to an ACD or other destination, in embodiments other extranets or other connections, such as Internet Protocol (IP)-based or other networks, protocols or connections, may support the connection bridge. The scope of the invention is accordingly intended to be limited only by the following claims.

What is claimed is:

1. A system for bridging a call in a network connecting the call to a first destination and a second destination with intermediate communication links that are each associated with a dialed number identification service (DNIS) label associated with the call, comprising:
   an interface to receive the call via the network, wherein the received call is connected to the first destination; and
   a routing engine, the routing engine communicating with the interface to direct the call from the first destination to the second destination and to selectively bridge the call from the network to the second destination via a virtual network by:
      analyzing the DNIS label associated with each intermediate communication link to determine whether the intermediate communication links are part of the same call flow, and
      upon determining that the analyzed DNIS labels associated with the intermediate communication links identify the are intermediate links as part of the same call flow, establishing a direct connection between the network and the second destination via a virtual network and terminating at least one of the intermediate communication links.

2. A system according to claim 1, wherein the network comprises a long distance telephone network.

3. A system according to claim 2, wherein the long distance network comprises a toll-free connection.

4. A system according to claim 1, wherein the virtual network comprises a virtual private network.

5. A system according to claim 1, wherein the terminating comprises processing a release link trunk command.

6. A system according to claim 1, wherein the first destination comprises at least one of an automated response resource and an automatic call distributor.

7. A system according to claim 1, wherein the second destination comprises at least one of an automated response resource and an automatic call distributor.

8. A system according to claim 1, wherein to selectively bridge comprises transferring call data associated with the call to the second destination.

9. A method for bridging a call in a network, comprising:
   receiving a call via a network;
   connecting the call to a first destination;
   directing the call from the first destination to a second destination;
   associating intermediate connection links connecting the network, the first destination, and the second destination with a dialed number identification service (DNIS) label associated with the call; and
   selectively bridging the call from the network to the second destination via a virtual network by:
      analyzing the DNIS label associated with each intermediate communication link to determine whether the intermediate communication links are part of the same call flow, and
      upon determining that the analyzed DNIS labels associated with the intermediate communication links identify the are intermediate links as part of the same call flow, establishing a direct connection between the network and the second destination via a virtual network and terminating at least one of the intermediate communication links.

10. A method according to claim 9, wherein the network comprises a long distance telephone network.

11. A method according to claim 10, wherein the long distance network comprises a toll-free connection.

12. A method according to claim 9, wherein the virtual network comprises a virtual private network.

13. A method according to claim 9, wherein terminating comprises processing a release link trunk command.

14. A method according to claim 9, wherein the first destination comprises at least one of an automated response resource and an automatic call distributor.

15. A method according to claim 9, wherein the second destination comprises at least one of an automated response resource and an automatic call distributor.

16. A method according to claim 9, wherein the selectively bridging comprises transferring call data associated with the call to the second destination.

17. A bridged call, the bridged call being transferred in a network according to a method comprising:
   receiving a call via a network;
   connecting the call to a first destination;
   directing the call from the first destination to a second destination;
   associating intermediate connection links connecting the network, the first destination, and the second destination with a dialed number identification service (DNIS) label associated with the call; and
   selectively bridging the call from the network to the second destination via a virtual network by:
      analyzing the DNIS label associated with each intermediate communication link to determine whether the intermediate communication links are part of the same call flow, and
      upon determining that the analyzed DNIS labels associated with the intermediate communication links identify the are intermediate links as part of the same call flow, establishing a direct connection between the network and the second destination via a virtual network and terminating at least one of the intermediate communication links.

18. A bridged call according to claim 17, wherein the network comprises a long distance telephone network.

19. A bridged call according to claim 18, wherein the long distance network comprises a toll-free connection.

20. A bridged call according to claim 17, wherein the virtual network comprises a virtual private network.

21. A bridged call according to claim 17, wherein terminating comprises processing a release link trunk command.

22. A bridged call according to claim 17, wherein the first destination comprises at least one of an automated response resource and an automatic call distributor.

23. A bridged call according to claim 17, wherein the second destination comprises at least one of an automated response resource and an automatic call distributor.

24. A bridged call according to claim 17, wherein selectively bridging comprises transferring call data associated with the call to the second destination.

* * * * *